United States Patent
Asakawa et al.

[15] 3,697,546
[45] Oct. 10, 1972

[54] METHOD OF PRODUCING TRIOXAN

[72] Inventors: Kazuo Asakawa, Kaoru Narita, both of Niigata-shi, Japan

[73] Assignee: Japan Gas-Chemical Company, Inc., Tokyo, Japan

[22] Filed: Jan. 14, 1970

[21] Appl. No.: 2,694

[52] U.S. Cl. ................................................. 260/340
[51] Int. Cl. .............................................. C07d 19/00
[58] Field of Search ....................................... 260/340

[56] References Cited

UNITED STATES PATENTS

| | | | |
|---|---|---|---|
| 2,270,135 | 1/1942 | Mikeska et al. | 260/340 |
| 3,005,799 | 10/1961 | Wagner | 260/340 |

FOREIGN PATENTS OR APPLICATIONS

| | | | |
|---|---|---|---|
| 375,744 | 6/1932 | Great Britain | 260/340 |
| 252,913 | 3/1967 | Austria | 260/340 |

*Primary Examiner*—Norma S. Milestone
*Attorney*—Wenderoth, Lind & Ponack

[57] ABSTRACT

The present invention relates to a method of producing trioxan which involves heating a liquid mixture of formaldehyde and a lower aliphatic hydrocarbon in the presence of a solid acid catalyst. More specifically, according to the present invention, raw formaldehyde having a relatively high water content can be used as the starting material by removing the water from the system in an azeotropic mixture with the lower aliphatic dihalide by a distillation procedure and heating the residual formaldehyde—lower aliphatic hydrocarbon halide in the presence of a solid acid catalyst to form the objective trioxane product.

8 Claims, 1 Drawing Figure

METHOD OF PRODUCING TRIOXAN

DETAILED DESCRIPTION OF THE INVENTION

This invention relates to a method of producing s-trioxan (this term will hereafter be designated "trioxan" throughout the disclosure) which is cyclic trimer of formaldehyde by means of the polymerization of formaldehyde and more particularly relates to a method of producing trioxan from formaldehyde in the presence of a lower aliphatic hydrocarbon dihalide as a reaction medium by use of a solid acid catalyst in a liquid phase.

It is well known that trioxan is produced from formaldehyde using an acid catalyst in a liquid phase. In this method water and an organic solvent may be used as a reaction medium.

The reaction whereby water is used as a reaction medium is as follows:

50 –70 weight percent of an aqueous formaldehyde solution is added to a water soluble non-volatile strong acid such as sulfuric acid or phosphoric acid to be used as a catalyst, followed by distilling out trioxan, thus-obtained, together with water and formaldehyde; then trioxan is extracted from the above-mentioned distillate with an organic solvent.

In the above method, it is necessary to accomplish the reaction by removing the trioxane out of this system by means of azeotropic distillation with water, since the equilibrium of the formation trioxane in the aqueous formaldehyde solution lies very close to that of formaldehyde. In order to promote the reaction rate and distillation rate, however, when too high a distillation temperature is used, distillation of the aqueous formaldehyde solution is carried predominately rather than the formation of trioxane, which causes a loss of formaldehyde, and when too high an acid concentration is utilized in the catalyst system, the Cannizzaro reaction takes place. Furthermore, too high a concentration of the raw material causes a great loss of formaldehyde through distillation, and when the concentration of the formaldehyde in the aqueous formaldehyde solution is over 70 weight percent, it brings about undesirable results such that the deposition of paraformaldehyde is remarkably increased owing to the presence of the acid catalyst even at ordinary reaction temperatures. In fact, it is difficult to obtain a high yield of trioxane based on the raw material formaldehyde. For this reason, the reaction must be limited to a distillation temperature of 91° –93° C, to an acid concentration of no more than 8 weight percent, and to a formaldehyde concentration in the raw aqueous formaldehyde solution of no more than 60 weight percent. Therefore, the method whereby water is used as a reaction medium is not preferably utilized in the industry.

On the other hand, there is employed a method whereby an organic solvent is used as the reaction medium in an attempt to overcome the above-mentioned disadvantages. The reaction medium in such a method is a solvent of the aromatic or alicyclic group such as benzene, toluene, xylene, cyclohexane, petroleum benzine or ligroine, or an organic solvent comprising the afore- mentioned solvents principally and wherein the catalyst is an acid compound such as sulfuric acid, ferrous sulfate, benzenesulfonic chloride and toluenesulfonic acid, or mixtures of more than these two components, whereby the reaction is carried out in a liquid phase. In such a method, trioxane is successively obtained by heating paraformaldehyde (Japanese patent publication No. 37/11033.

The above method is of some interest compared to the method wherein water is used as the reaction medium. However, the disadvantage of such a method is that it is necessary to remove the catalyst prior to extraction of the trioxane or to the recovery of the unreacted formaldehyde, since some amount of the catalyst may remain in the products in the state of a liquid or a solution; the yields based on the raw formaldehyde are low such as about 20 –50 percent, and the re-use of the catalyst is not expected to decrease the benefit for using the organic solvent. For these reasons, the method is not advantageously used in the industry.

There is another method of producing trioxan in which a solid acid catalyst may be used. Details of this method are given in Japanese patent publication No. 40/12898 and 40/20552 and French Pat. No. 1,400,913. These methods, however, are those of the so-called gas-phase reaction in which trioxane is produced by treating gaseous formaldehyde through the solid acid. These methods have various disadvantages in that a highly purified gaseous formaldehyde must be used as the raw material, and moreover, the yield is only 50 percent or so even in the case of using gaseous formaldehyde containing extremely little water. Further, it is difficult to separate and recover trioxane from the unreacted formaldehyde. As a result of these disadvantages it has never been embodied in the industries.

The object of this invention is to overcome the above-mentioned disadvantages in prior methods and to provide a new method of producing trioxane in a high yield and which has an industrial advantage in that it is extremely easy to remove or take off the catalyst. In this method, trioxane is produced by heating formaldehyde in the presence of lower aliphatic hydrocarbon dihalide using a solid acid catalyst under a liquid phase.

The reaction medium used in this method is a saturated or unsaturated lower aliphatic hydrocarbon dihalide of one to four carbon atoms, such as dichloromethane, dibromomethane, diiodomethane, bromoiodomethane, 1,1-dichloroethane, 1,1-diiodoethane, 1,1-dibromoethane, 1,2-dichloroethane, 1,2-dibromoethane, 1,1-dichloropropane, 2,2-dibromopropane, 1,2-dichloropropane, 1,2-diiodopropane, 1,3-dichloropropane, 1,3-dibromopropane, 1-chloro-2-bromoethane, 1,2-dibromoethylene, 1,2-dichloroethylene, 1,2-diiodoethylene, alone or the mixtures thereof. If an aliphatic hydrocarbon dihalide of five or more than five carbon atoms is used, it will decrease the reaction rate and therefore is outside of the scope of this invention. Generally, the reaction rate is higher in the case of using saturated lower aliphatic hydrocarbon dihalides rather than in the case of using unsaturated ones, and, therefore, it is preferable ot use saturated lower aliphatic hydrocarbon dihalides of one to two carbon atoms. In addition, lower aliphatic hydrocarbon dichloride is more suitable practically because of the ease of treatment and preparation using this solvent. The use of mono- or trihalides is unsuitable due to the fact that the yield of trioxane is extremely little or never produced. Also, the use of other organic solvents as the reaction medium instead of the above-mentioned saturated or unsaturated lower aliphatic hydrocarbon dihalides, for example, aromatic hydrocarbons, alicyclic hydrocarbons, or the halides thereof does not result in the production of any trioxane.

As the solid acid catalyst to be used in this invention, a solid acid catalyst containing aluminum is most suitable. As to the solid acid catalyst containing aluminum, alumina or silica-alumina alone or alumina or silica-alumina mixed or impregnated with sulfuric acid, phosphoric acid or boric acid may be used, of a salt of the inorganic acid alone such as aluminum sulfate or aluminum phosphate, or a silica gel or a silicon carbide mixed or impregnated with such salt can be employed. A mixture of the oxide and salts can also be used. The purified alumina and silica-alumina as the catalyst and silica gel as the carrier substituted by natural materials containing alumina, silica alumina or silica gel as their main component such as activated clay, zeolite or diatomaceous earth may be employed. These catalysts are prepared by ordinary methods. For example, silica-alumina catalyst impregnated with sulfuric acid is prepared by the following procedure; a commercial silica-alumina as the catalyst is added to an aqueous solution of sulfuric acid of guaranteed grade, and allowed to stand over-night at the ordinary temperature. The this mixture is dried on a steam bath for about half a day and further heated in a drier at 100°–120 °C for 24 hours. When silica gel for drying and aluminum sulfate are used instead of silica-alumina and sulfuric acid respectively, silica gel catalyst impregnated with aluminum sulfate is conveniently prepared. The manner of use of these catalysts involves the following two general techniques.

The first is to crush these catalysts into fine powder which is floated on the reaction solution. The second technique is to permit these catalysts to be formed into a solid acid catalyst of desired shape having a comparatively large particle diameter by using a binder (or in some cases without using a binder) which is then packed in a reactor. In the event of the former, that is wherein a floating powder of the catalyst is used, the acidity of the catalyst floated on the organic solvent reaction medium is 0.001 N to 0.2 N, preferably 0.005 N to 0.1 N measured by the amine tetrimetric method. This acidity limitation, as defined above, depends on an easiness of agitation when it is necessary to accomplish the reaction smoothly by means of said agitation, or on the easiness of taking off the catalyst when recovering the trioxane, as well as on the reaction rate. In the industrial operation, the aforementioned acidity limitation is sufficient. In the use of the latter technique, that is wherein a solid acid catalyst which is formed and packed in reactor, it goes without saying that the acidity of the catalyst is not a factor.

The reaction temperature of the present invention is between 50° C and 180° C. Under lower temperatures, the reaction rate is controlled at too slow a rate, whereas under higher temperatures the reaction process may produce a large amount of the methyl formate by-product. It is preferable to control the temperature between 80° C and 130° C taking into consideration the optimum reaction rate and restraint of the undesirable by-product.

The formaldehyde used in this invention may contain paraformaldehyde or α-polyoxymethylene which are polymers of formaldehyde, and also water at any ratio. It is also a preferable feature of the present invention that formaldehyde with no more than a 95 weight percent of water content is used, and more preferable the material should contain no more than 70 weight percent of water.

The practical reaction systems for producing trioxane according to the water content of the raw formaldehyde are set forth below:

When formaldehyde with a small water content such as no more than 20 weight percent is used, lower aliphatic hydrocarbon dihalides are mixed with the formaldehyde and the solid acid catalyst is added to make a suspension in said solution, wherein the production of trioxane may be carried out batchwise. It is also possible to introduce continuously the material mixture or gaseous formaldehyde and the lower aliphatic hydrocarbon dihalide into a continuous reactor which is provided with catalyst in powder or solid form.

Due to the fact that excess water i.e. over 20 weight percent in the material mixture, will act as undesirable substance, the water content of the material formaldehyde must be no more than 20 percent by weight, and preferably no more than 10 weight percent in the above-mentioned practice. Furthermore, the amount of the formaldehyde used should be no more than 0.3 preferably 0.02 –0.3 in respect to the lower aliphatic hydrocarbon dihalide. The reaction rate upon converting the formaldehyde into trioxane is subject to the concentration of the formaldehyde dissolved in the lower aliphatic hydrocarbon dihalide, so that the higher the concentration of dissolved formaldehyde may result in an increase of the reaction rate. In view of the fact that the solubility of the formaldehyde in the lower aliphatic hydrocarbon dihalide is usually small, an excess of formaldehyde over its solubility will not be dissolved in the lower aliphatic hydrocarbon dihalide media and therefor exist in media in dispersion. However, the formaldehyde existing in dispersion therein will be dissolved in the formaldehyde in proportion to the amount of formaldehyde converted into trioxan. Nevertheless, if an excess of undissolved formaldehyde remains in the media near the end point of the reaction and after the reaction attains equilibrium, the excessive formaldehyde will remain in the lower aliphatic hydrocarbon dihalide in the form of paraformaldehyde which would swell to cause resistance to stirring and, furthermore, result in the blocking of both the reaction column and tube. On the contrary, if the amount of formaldehyde dissolved into media is very small, the reaction rate would decrease so as to result in an economical disadvantage.

In conclusion, the preferable ratio of raw formaldehyde in the lower aliphatic hydrocarbon dihalide should be no more than 0.3 and the proportions of formaldehyde based on the media should preferably be in a ratio of 0.02 to 0.3.

The raw material mixture of the present invention is charged into a batch reactor, preferably into a continuous reactor. The latter continuous reactor provided with a catalyst layer in fixed-bed or in a slurry can yield trioxane of 70 percent based on the charged formaldehyde for one pass of the charge. Additionally, the reaction proceeds selectively without the formation of by-products. Dissolution of the catalyst in the product is absolutely avoided by use of a solid acid catalyst in this manner. Therefore, trioxane can be separated and unreacted formaldehyde can be recovered easily from reaction solution by ordinary methods, such as distillation without preliminary treatment of the reaction product. Moreover, the lower aliphatic hydrocarbon dihalide media may be used again after recovery from the reaction solution, since the media is not changed at all during the reaction. The gaseous formaldehyde raw material may be supplied into the reactor in a countercurrent, or in a direction parallel to the flow of media. The gaseous formaldehyde may be diluted by use of an inactive gas such as nitrogen.

When a batch reactor is used, the yielded solution contains the catalyst. The catalyst, however, may be instantly separated from the solution by ordinary means of filtration and also centrifugal separation. After this operation, the filtrate is purified in the same manner as in the continuous reactor method. The recovered lower aliphatic hydrocarbon dihalide and catalyst from the batch reaction is available for a subsequent reaction.

It is a distinguishable feature of the present invention that the previously described solid acid catalyst is insoluble or very slightly soluble in the lower aliphatic hydrocarbon dihalides used in the present invention, so that the solid acid catalyst is not dissolved in the lower aliphatic hydrocarbon dihalide. In the manner of practice, the reaction time for producing trioxane may be optionally defined in accordance with the kind of solid acid, the nature of the reaction media, the reaction temperature, the concentration of formaldehyde in the reaction solution, the technique employed and so on. Generally, the reaction proceeds preferably and sufficiently for 2 to 6 hours in a batch technique, and for 5 to 60 minutes in a continuous technique. Too short a reaction time results in a small yield of trioxane and too long a reaction time results in the formation of methyl formate, which is a by-product.

Another manner of practicing the present invention will be explained wherein raw formaldehyde with a high water content is used. This manner comprises removing the water in the raw material formaldehyde by azeotropic distillation with a lower aliphatic hydrocarbon dihalide in order to reduce the water content therein, to no more than 20 weight percent, and yielding secondly trioxane from the remainder in the same manner described above. For example, it is possible to use raw formaldehyde containing no more than 95 weight percent of water. However, commercial aqueous formaldehyde solution with 30 to 80 weight percent of water is preferably used to bring about the most optimum features of this method. Additionally, paraformaldehyde, α-polyoxymethylene and such other materials as formaldehyde containing methanol may be also used.

The group of lower aliphatic hydrocarbon dihalides previously mentioned can preferably be used in this method. Additionally, the amount of lower aliphatic hydrocarbon dihalide used is calculated so that a weight ratio of 0.02 to 0.3 of formaldehyde, based upon lower aliphatic hydrocarbon dihalide, is left in the remainder reaction solution after the water contained in material formaldehyde is removed by azeotropic distillation with said lower aliphatic hydrocarbon dihalide. For instance, when 100 g of 40 weight percent of aqueous formaldehyde solution is distilled with 1,2-dichloroethane, the amount of 1,2-dichloroethane used is in the azeotropic distillation for removing water therefrom, is about 240 g. and the amount of 1,2-dichloroethane required in the remainder after distillation is between 133 g and 2,000 g. The total amount of the media of 1,2-dichloroethane required, therefore, is between 373 g and 2,240 g. If the rate of formaldehyde in proportion to the lower aliphatic hydrocarbon dihalide is larger than 0.3 the reaction solution would not be in the form of a transparent and homogeneous solution. It must also be pointed out that when the ratio of the formaldehyde based on the weight of the dihalide is less than 0.02 the velocity of reaction would fall and the reactor utilized in such a reaction would be large relative to the amount of formaldehyde used.

The residue containing both formaldehyde and the media of lower aliphatic hydrocarbon dihalide after the above-mentioned azeotropic distillation, should contain water in as small amount as possible, for instance, in amounts of no more than 20 weight percent based on the formaldehyde, and preferably no more than 10 weight percent.

In a batch-wise process or semibatch-wise process, the addition of catalyst to reaction mixture in the distilling pot may be done before or after the azeotropic distillation of water with said halide.

It is possible to conduct the reaction either batchwise or continuously in the azeotropic distillation of the mixture of the raw formaldehyde and the lower aliphatic hydrocarbon dihalide according to this method. However, it must be pointed out that it appears to be more advantageous to utilize the continuous-process in both the distillation and the reaction steps, since it has various advantages in that it avoids certain disadvantages such as stoppages in the transferring pipe which is undoubtedly caused by separating the paraformaldehyde because the liquid exhausted from the distillation apparatus in continuously supplied to the reactor at a high temperature. Furthermore, the heat of said liquid itself is useful to the reaction.

In operating the distillation step, it is generally unavoidable that a small amount of formaldehyde is mixed with the distillate at the top of the distilling apparatus, but in this case it is possible to limit this to a small amount by use of suitable distilling apparatus having large number of plates or to adopt a large reflux ratio. Moreover, since the lower aliphatic hydrocarbon dihalide used in this invention is a hydrophobic solvent, it is very easy to recover the solvent from the distillate and is possible to re-use the solvent.

As previously described, the inventive concept of this method comprises a combination of the following two processes; that is, (1) a process of mixing formaldehyde containing water and a lower aliphatic hydrocarbon dihalide, and distilling in order to remove or take off water contained in said formaldehyde as its azeotropic mixture with said lower aliphatic hydrocarbon dihalide, and (2) a process of producing trioxane from formaldehyde obtained by the above process (1) by using a solid acid catalyst.

The method of this invention has various advantages. The solvent used in both process (1) and (2) is identical. The residue solution obtained by process (1) is a transparent and homogeneous solution and therefore the reaction of the process (2) in which said bottom solution is used is very smoothly carried out. This is an effect achieved by the combination of the process (1) and (2). On application thereof for actual industry, further technical advantages are simplified in the transport of the solution; easiness of agitation in a reactor or, when a continuous distilling apparatus packed with solid acid catalyst is used, in the smooth introduction or passage of the solution in said apparatus. Thus, since the reaction is smoothly carried out, it is possible to shorten the residence time in the reactor and subsequently to increase the efficiency of the apparatus, which brings about greater technical and economical profits.

There is still another advantage in that the raw materials in this inventive method include a wide range of substances, and the water content in the raw formaldehyde covers a wide range. This is the most remarkable effect as compared with the prior method of synthesizing trioxane. Also, as the lower aliphatic hydrocarbon dihalide in this method forms an azeotropic mixture with water, it has generally a lower boiling temperature of all the components in the distillation of aqueous formaldehyde solution and said solvent. This will effectively lessen the loss of formaldehyde caused by the possible distillation of the formaldehyde.

According to the above method, the trioxan can be produced in a high yield and its reaction time is very short in spite of using formaldehyde of a high water content.

In the event that the water in the formaldehyde is no more than 20 weight percent, the reaction is not subject to interference from such amount of water and it does not need to be dehydrated. Moreover, when the formaldehyde of no more than 20 weight percent of water content is subjected to this inventive method, the bottom residual solution, obtained as a result of the azeotropic distillation, is found to be a transparent and homogeneous solution which advantageously results in a short reaction time.

The third procedure in the present method of producing trioxane is that a distilling apparatus is packed with a solid acid catalyst and is supplied with a mixture of formaldehyde containing water and lower aliphatic hydrocarbon dihalide, which mixture boils azeotropically with water at a lower temperature than the azeotropic temperature between water and trioxane. Further, after the water and said lower aliphatic hydrocarbon dihalide are separated by azeotropic distillation; the formaldehyde is converted to trioxane in the presence of said lower aliphatic hydrocarbon dihalide at the packing portion of said solid acid catalyst, and the trioxane thus formed is easily separated.

Although the first and the second method as described above, have some advantages in that trioxane is produced from the formaldehyde selectively in a rather high yield, it still has a disadvantage in that yields higher than 80 percent of the trioxane cannot be expected because of the equilibrium of the reaction. The third method, however, is independent of the equilibrium of the reaction and from the industrial point of view this third method has a very desirable advantage in producing trioxane with high yield based on the raw formaldehyde.

The distillation apparatus of this method is provided with a distilling column packed with a solid acid catalyst therein. It is a preferable feature to provide a three layer construction equipped with upper and lower fractionating portions of packings or plates which are located upwards and downwards in respect to the layer of the solid acid catalyst respectively. In the construction of this type, the upper fractionating portion will operate to prevent or lessen the escape of formaldehyde and to allow only contained water to distill off, and the lower fractionating portion will operate to prevent trioxane now produced from evaporating into a layer of the solid acid catalyst. Thus, the reaction in which trioxane is produced from formaldehyde may not be stopped or slowed in view of the afore-mentioned equilibrium of the reaction. However, when the water contained in said formaldehyde is small and does not need to be removed, the apparatus can preferably be designed in two layers equipped with only a lower fractionating portion. Also, when the lower aliphatic hydrocarbon dihalide having a volatility markedly different from that of trioxane is used as the hydrocarbon dihalide, it is possible to omit the lower fractionating portions and prepare a two layer construction equipped with only an upper fractionating portion.

The number of plates used in the distilling column are determined by conventional methods according to the kind of lower aliphatic hydrocarbon dihalide used and/or the pressure therein during the distillation. The longitudinal length of the layer of said catalyst is determined by the activity of the catalyst or the reaction temperature, etc. Furthermore, this invention is suitable either in the batch and/or continuous process.

Although the raw formaldehyde is not restricted or determined by the proportion of water content, the higher the proportion of water content used, the larger the amount of the lower aliphatic hydrocarbon dihalide required and subsequently a larger distillation apparatus is required. Further, the thermal efficiency is decreased. Therefore, it is desirable to use formaldehyde having water content of no more than 95 weight percent and more preferably no more than 60 weight percent. Methanol or methyl formate is not a hindrance if it is contained therein.

The lower aliphatic hydrocarbon dihalide used in this invention is distilled azeotropically with water at a temperature lower than the azeotropic temperature between trioxane and water. As the lower aliphatic hydrocarbon dihalides used in this method, for instance dichloromethane, 1,1-dichloroethane, cis 1,1-dibromoethylene, 1,2-dichloroethane, 1,1-dichloropropane, 1,2-dichloroethylene can inter alia, be employed, and among these a compound which has a higher proportion of water content in the azeotropic mixture is particularly preferably used.

The amount of the lower aliphatic hydrocarbon dihalide used depends on the kind thereof and the proportion of water content in the raw formaldehyde etc. That is, the sum total of the amount of dihalide used should be sufficient to form an azeotropic mixture with water to be removed and in an amount sufficient to be used as a reaction medium at the layer of the solid acid catalyst. The reaction itself, however, is not adversely affected by using an amount of hydrocarbon dihalide greater than this functional amount. On operation of this method by a continuous distillation method using the lower aliphatic hydrocarbon dihalide of the minimum amount desired, it is also possible to obtain actually only trioxane from the bottom outlet of the column.

When formaldehyde having no more than 20 weight percent of the proportion of water content is used, the amount of hydrocarbon dihalide is determined merely by the easiness of its handling, since when the amount of the lower aliphatic hydrocarbon dihalide is small, it results in a decrease of liquidity or fluidity in the formaldehyde mixture, and distillation becomes especially difficult. Also, when a continuous process is conducted, its transport and supply becomes somewhat difficult. Thus, when operated by batch process, the method is carried out by using no more than 2.0 kg. of formaldehyde, more preferably no more than 0.5–1.5 kg. based on 1 liter of the lower aliphatic hydrocarbon dihalide. When operated by a continuous process, the method is carried out by using no more than 0.2 kg. of formaldehyde, more preferably no more than $0.1 \approx 0.15$ kg. based on 1 liter of the lower aliphatic hydrocarbon dihalide. The temperature at the portion of the solid acid catalyst layer in this method is from 50° to 180° C and on an industrial scale, a temperature of 80° to 130° C is preferably used. The reaction may be carried out under reduced pressure, ordinary pressure or superatmospheric pressure depending on the kind of lower aliphatic hydrocarbon dihalide used and the reaction temperature.

According to this method water contained in formaldehyde is removed azeotropically from the top of the distillation column as an azeotropic mixture of water and the lower aliphatic hydrocarbon dihalide, and if methanol or methyl formate is contained in the raw formaldehyde, these compounds are also distilled out as the distillate. In this operation, a small amount of formaldehyde may sometimes be contained in such distillate, but actually it is still possible to permit the evaporation thereof to be almost negligible by means of suitable selection of the number of plates and reflux ratio, which is a conventional method in the general conventional distillation process.

When the formaldehyde having a lower proportion of water content is used, the reflux ratio may be required to be extremely high. In particular, when formaldehyde having a lower proportion of water content, such as no more than 20 weight percent, is used and operated by the batch process, the reaction may preferably be operated by total reflux.

The reaction for producing trioxane from formaldehyde according to this method is accomplished during a very short time in the presence of the lower aliphatic hydrocarbon dihalide at the portion of the layer of solid acid catalyst. The amount of materials supplied in the continuous process reaction is determined, for example, by Sounders Brown's equation.

In the above reaction system, trioxane which is obtained in the form of trioxane or a mixture of trioxane with a lower aliphatic hydrocarbon dihalide, contains substantially no impurities. The former is not necessarily purified, and the latter can be easily separated into trioxane and lower aliphatic hydrocarbon dihalide by the usual way, such as distillation.

The following is a detailed explanation of one practical mode of carrying a batch system based on the present invention. A distilling column which comprises the upper zone of the fractional distillation, a middle layer of a solid acid catalyst and a lower zone of fractional distillation therein, is connected to a batch distillation still. The raw material mixture of aqueous formaldehyde and lower aliphatic hydrocarbon dihalide is charged into said batch still. Secondly, water therein is removed by way of an azeotropic distillation with said lower aliphatic hydrocarbon dihalide in such a manner as to reduce the water content in the remainder solution i.e. after distillation) to an amount of no more than 20 percent by weight and preferably no more than 10 percent by weight. As a consequence of the diminution of water therein, the production of trioxan may proceed in the catalytic layer, and trioxane thus formed falls off in the still, without distilling off from the top of the distilling column. Moreover, if the whole system of reaction is conducted under total reflux after removal of water from the material mixture, formation of trioxane proceeds preferably at the catalytic layer, from which trioxane is removed successively into the batch still so that all of the formaldehyde can be converted substantially into trioxane.

Other modified modes based upon above-mentioned batch system may properly be carried out. For example, one modification of the batch system can be carried out in a conventional distilling column which is not packed with a layer of solid acid catalyst, and is connected to an upper portion of a distillation still. A condenser connecting upward to said distilling column, a reactor provided with a layer of solid acid catalyst, and a communicating pipe between the said reactor and said distillation still may be constructed to effect the reaction. In this mode, the same material mixture is charged into the distillation still; water and lower aliphatic hydrocarbon dihalide are distilled azeotropically, and the azeotropic mixture is taken off out of system through a bypass prior to the catalytic layer. After the removal of water is completed, the said bypass is closed, and the reaction proceeds in a circulating pass comprising the distillation still, the distilling column, the condenser, and the catalytic layer, wherein both the unreacted formaldehyde and lower aliphatic hydrocarbon dihalide are circulated through the catalytic layer and the trioxane formed is collected in distilling still.

Figure 1:
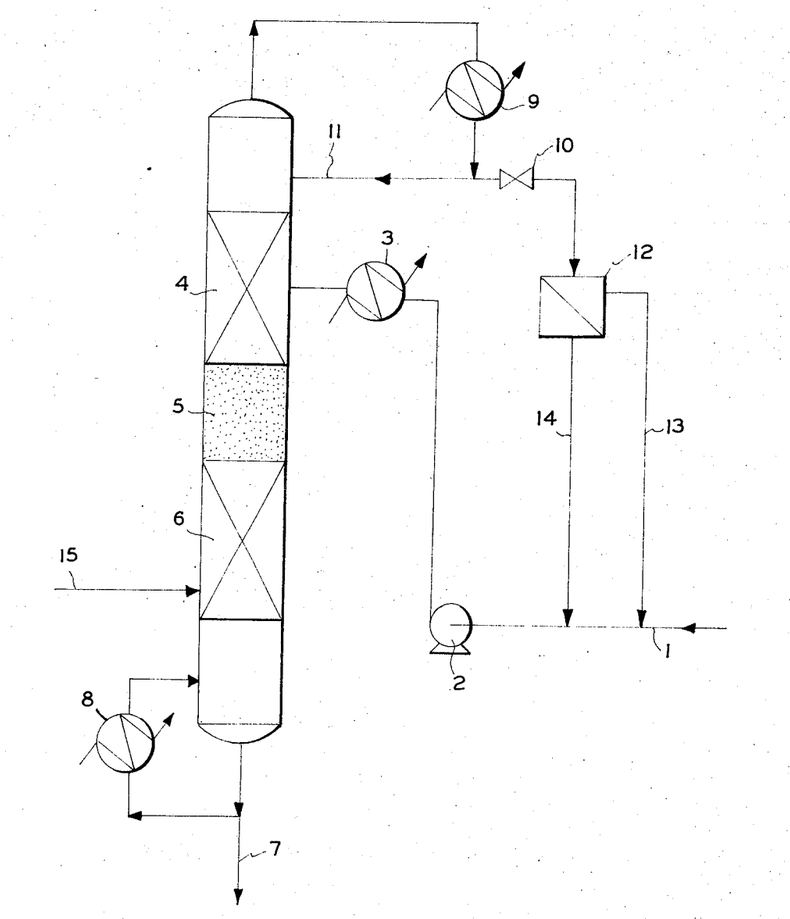
FIG. 1 illustrates one example of a process diagram for carrying out continuously the method according to the present invention using a distilling apparatus packed with a solid acid catalyst.

The following is a description of a preferable mode of carrying out the invention in a continuous method, or an industrial basis illustrated diagrammatically in FIG. 1. This illustration comprises basically a three layer construction. The flowing pass of the raw mixture of both formaldehyde and the lower aliphatic hydrocarbon dihalide is introduced into an upper zone 4 of a fractional distillation column through a tube 1, a pump 2 and a pre-heater 3, and whereupon the material charge is introduced at the part of the upper zone that has same components as the raw material mixture. At the fractional zone 4, water in the raw mixture forms an azeotropic mixture with the lower aliphatic hydrocarbon dihalide, and the azeotropic mixture containing water is transferred to the top of the reaction tower. The formaldehyde which is occasionally mixed with the said azeotropic mixture is separated during the transfer in the fractional zone 4 and remains in the reaction tower. Said azeotropic mixture containing water is condensed through a condenser 9 which is connected with the top of a reaction tower and divided into two flows. The one flow is introduced into the decanter 12 through the valve member 10 which is attached to a pipe between the decanter 12 and the condenser 9, and the other flow of liquid is directly refluxed into the top of the tower.

On the other hand, at the decanter 12, the distillate as the azeotropic mixture is separated to form two phases of solution comprising water and a lower aliphatic hydrocarbon dihalide respectively. And, if the water phase contains formaldehyde, said water may be circulated into the reaction tower through the tube member 1 through tube member 13, if necessary. Meanwhile, the lower aliphatic hydrocarbon dihalide separated at the decanter 12, is caused to flow through the tube member 1 through another tube member 14, and is mixed with the charge of material formaldehyde.

Most of the material formaldehyde from which water is removed at the fractional zone 4 falls into the catalytic layer 5, containing the media of lower aliphatic hydrocarbon dihalide, wherein formaldehyde is converted into trioxane in a short time. Then, said trioxane produced in the catalytic layer 5 is carried into the lower fractional distillation zone 6 and removed from the zone 6 at the bottom of the tower. Under appropriate determination both in the number of plates in the lower zone 6 and the amount of lower aliphatic hydrocarbon dihalide used in the material mixture, the trioxane product and the lower aliphatic hydrocarbon dihalide are completely separated from the fractional zone 6, so that the outlet tube 7 connected with the bottom of the tower contains trioxane in a high purity. Hereupon, a portion of the liquid product is circulated into the bottom through reboiler 8 to give enough heat to distil the lower aliphatic hydrocarbon dihalide in the fractional zone 6.

The lower aliphatic hydrocarbon dihalide is separated from the trioxane in the fractional zone 6 and transferred upwardly towards the upper fractional zone 4 through the catalytic layer 5, wherein said lower aliphatic hydrocarbon dihalide is mixed with the formaldehyde which drops from the upper portion of the upper fractional zone 4 into the catalytic layer 5 in a state of mixture with the formaldehyde to form trioxane. Heat sufficient to effect the azeotropic distillation of removal of water in the fractional zone 4 is furnished by the heat of condensation of the lower aliphatic hydrocarbon dihalide in the fractional zone 4. Finally, the lower aliphatic hydrocarbon dihalide remains in a constant amount in the lower zone 6, in the catalytic layer 5 and also in the lower portion of the upper zone 4 where it is transferred into the upper zone 4 either upwards or downwards as a liquid. In a preferable mode of operation, the lower aliphatic hydrocarbon dihalide is supplied from a tube 15 installed at the lower zone 6 of the fractional distillation column.

Thus, formaldehyde with high water content at a low price can be successfully made use of in the chemical industry for producing trioxane by applicants' method. Furthermore, the substantially anhydrous formaldehyde yields trioxane instantly when the conversion into the trioxane is forced to undergo a total reflux.

It is evident that by applicants' method, a wide range of formaldehyde having varying degrees of water can be used. Further, by this method, trioxane is easily produced in a high yield and in high purity, the bothersome separation of the unreactive formaldehyde is omitted.

Following are a list of examples illustrating the present invention, however, the examples are not intended to limit the scope of the instant invention.

EXAMPLE 1

Into a sealed reactor are added 50 g of paraformaldehyde containing 95 weight percent of formaldehyde crushed into a powder such that it passes through 60 mesh wire and 500 cc of 1,2-dichloroethane into which mixture is added a 10 g (0.008 N) of dried powder of a silica alumina catalyst containing 13 weight percent of alumina. The reaction was run at 100° C for 4 hours with effective shaking in an oil bath. As soon as the reaction was over, the reaction system was cooled and its contents were filtered. It was found that 34.6 g of trioxane was contained in the above filtrate, that is, in the solution of 1,2-dichloroethane. The unreacted formaldehyde was 12.8 g. The yield of trioxane thus-obtained was 73 percent based on the raw formaldehyde. No by-products were found therein.

EXAMPLE 2

Into a sealed reactor are added 50 g of paraformaldehyde containing 96 weight percent of formaldehyde crushed into a powder so that it passes through a 100 mesh wire, said powder being dispersed in 500 cc of dichloromethane. To this is added 10 g (0.01 N) of a powdered catalyst prepared from 1,000 weight parts of silica alumina as in Example 1 and further impregnated with 98 weight parts of phosphoric acid and dried at 100° C for 24 hours. The reaction was run at 110° C for 2 hours with effective shaking in an oil bath, and, after the reaction, the contents in the reactor were cooled and then filtered. It was found that 34 g of trioxane were contained in the above filtrate, whereas the unreacted formaldehyde was 12.8 g. In this, a very little by-product was observed. The yield of trioxane thus-obtained, based on the raw formaldehyde, was 70 percent.

EXAMPLE 3

Into a sealed reactor are added 50 g of paraformaldehyde containing 95 weight percent of formaldehyde crushed into a powder so that it passes through a 60 mesh sieve, said powder being mixed in 500 cc of 1,2-dibromoethane media. To this mixture is added 30 g (0.021 N) of a dried powdered silica alumina catalyst containing 25 weight percent of alumina. The reaction was run at 90° C for 5 hours with effective shaking in an oil bath. After the reaction, the reaction system was cooled and its contents were filtered. It was found that 33.4 g of trioxane were obtained from the filtrate and the unreacted formaldehyde was 13.0 g. No by-products were recognized. The yield of trioxane based on the raw formaldehyde was 70.3 percent.

EXAMPLE 4

Example 2 was substantially duplicated except 500 cc of diiodomethane was used and a 6 hour reaction period at 100° C was employed. The reaction resulted in the production of 32.6 g of trioxane. The unreacted formaldehyde in this reaction system was found to be 14.7 g. The yield of trioxane based on the raw formaldehyde was 68 percent.

EXAMPLE 5

This example was run in the same manner as Example 1, except that 20 g of catalyst prepared by mixing 100 weight parts of powdered silica gel and 11 weight parts of aluminum sulfate were used. The reaction resulted in the production of 35.1 g of trioxane. The unreacted formaldehyde in this reaction system was 11.0 g. The yield of trioxane thus-obtained, based on the raw formaldehyde was 73.8 percent.

EXAMPLE 6

This example was also essentially the same as Example 1, except that 10 g of catalyst prepared by mixing 1,000 weight parts of silica alumina containing 13 weight parts of alumina and 6.2 weight parts of boric acid were used and the temperature employed was 120° C. The reaction resulted in the production of 29.5 g of trioxane. The yield of trioxan thus-obtained, based on the raw formaldehyde, was 62.2 percent.

EXAMPLE 7

In a sealed reactor are added 50 g of paraformaldehyde containing 95 weight percent of formaldehyde crushed into a powder such that it passes through a 100 mesh sieve was dispersed in 500 cc of cis-1,2-dichloroethylene. To this dispersion is added 30 g (0.024 N) of powdered silica alumina, which is the same as in Example 1. The reaction was run at 120° C for 3 hours. After the reaction, the reaction system was cooled and then filtered. It was found that the filtrate contained 31 g of trioxane and that the unreacted formaldehyde in this reaction system was 16.2 g. In this system, only very little by-products were formed. The yield of trioxane thus-obtained, based on the raw formaldehyde, was 64.6 percent.

EXAMPLE 8

This example was run in the same manner as Example 7 except 1,3-dichloropropane was used as the media and the reaction time was carried out for 5 hours. The reaction resulted in the production of 32 g of trioxane. The yield of trioxane, based on the raw formaldehyde, was 66.6 percent.

EXAMPLE 9

In a sealed reactor are added 50 g of paraformaldehyde containing 95 weight percent of formaldehyde crushed into a powder such that it passes through a 100 mesh screen, said powder being dispersed in 500 cc of 1,2-dichloroethane. By adding 15 g of dried powder of alumina as a catalyst, the reaction was run at 140° C for 3 hours with effective shaking in an oil bath. After the reaction was over, the reaction system was cooled and then its contents were filtered. 33.4 g of trioxane were obtained in this example. The yield thereof based on the raw formaldehyde was 70.3 percent. Very little by-products were observed.

EXAMPLE 10

15 g of the catalyst used in Example 9 were mixed with 10 of a powder catalyst prepared from 1,000 weight parts of alumina impregnated with 49 weight parts of sulfuric acid and dried at 150° C for 24 hours. By operating in the same manner as in Example 9 except for using the above-mentioned catalyst, trioxane in an amount of 34.0 g was obtained. The yield thereof was 71.5 percent.

EXAMPLE 11

Instead of the catalyst used in Example 1, 20 g of catalyst powder prepared by mixing 100 weight parts of powdered silicon carbide and 12 weight parts of aluminum sulfate, dried at 150° C for 24 hours, was used therein. By operating in the same manner as in the Example 1 except for the catalyst used, 34.2 g of trioxane were obtained. The yield thereof, based on the raw formaldehyde, was 72 percent.

EXAMPLE 12

Into 5,500 cc of 1,2-dichloroethane is added 550 g of powdered paraformaldehyde containing 95 weight percent of formaldehyde crushed into a powder such that it passes through a 200 mesh sieve (whereas the total amount of this liquid mixture is brought up to 9,540 cc). This liquid mixture is led to a reactor through a pre-heater heated to about 80° C by means of a piston pump, said liquid being continuously agitated so that the powder is not subject to sedimentation.

The reactor was constructed in the form of a cylindrical shell or pipe of stainless steel having a diameter of 32 mm and a length of 700 mm stands vertically so that the raw materials are supplied to the bottom inlet and the products are carried away from an upper outlet. In the reactor, silica alumina catalyst is placed in a cylindrical form having a diameter of 3 mm and a height of 3 mm and containing 13 weight percent of alumina is packed so that it produces a layer as high as 500 mm therein. The reaction temperature is then set at 120° C by means of a temperature controller. On adjusting the pump, the raw materials are pumped at such a rate so as to supply a rate of 500 cc/hr, over a 10 hour period, 5,240 cc of the raw liquid are actually supplied. The product carried away from the outlet is stored in a stainless steel tank by means of a cooling pipe. Trioxane thus-obtained is in the amount of 332 g and the yield thereof based on the raw formaldehyde is 72 percent.

EXAMPLE 13

Instead of the raw formaldehyde used in Example 12, is used a raw liquid containing 5,500 cc of 1,2-dichloromethane and 1,100 g of paraformaldehyde containing 95 weight percent of paraformaldehyde crushed into powder so that it passes through a 200 mesh screen (whereupon the whole amount of this mixed liquid is brought up to 6,310 cc).

By operating in the same manner as in Example 12, except that only 5,650 cc of this mixed liquid is utilized and the reaction is carried out for 11 hours, 655 g of trioxane were obtained and the yield thereof was 70 percent.

EXAMPLE 14

In this example, the liquid is prepared by mixing 5,500 cc of dichloromethane and 1,100 g of paraformaldehyde containing 95 weight percent of paraformaldehyde crushed into powder such that it is smaller than that which passes through a 200 mesh sieve whereupon the total amount of liquid mixture is brought up to 6,320 cc. A catalyst prepared by impregnating 1,000 weight parts of formed silica alumina such as in the Example 12 is impregnated with 98 weight parts of phosphoric acid and dried at 110° C for 24 hours is added thereto. The reaction temperature employed is 110° C. The other conditions are the same as in Example 12 except for the foregoing changes. After 10 hours of operation, 579 g of trioxane were produced from 5,310 cc of the raw liquid supplied. The yield thereof was 71 percent based on the raw formaldehyde.

EXAMPLE 15

A stainless pipe having an inner diameter of 30 mm, a length of 600 mm, a cooling pipe and a constant pressure equipment at the top of the external heating pipe reactor is packed with the catalyst used in the Example 9 so that the height of 500 mm is achieved in the form of a layer. 1,2-dichloroethane which was previously heated at almost the same temperature as the reaction temperature, is supplied with pressure in an inlet attached 50 mm below the top of the external heating pipe reactor. The product is removed by one of two branch tubes attached to the bottom of the reactor and passes through a cooling apparatus wherein it is stored in a tank. By supplying gaseous formaldehyde with nitrogen gas into the other position of the two branch tubes, only nitrogen gas in said gaseous formaldehyde is discarded, passing through the cooling pipe and the constant pressure equipment at the top of the pipe reactor. At the same time, trioxane and unreacted formaldehyde produced in the pipe reactor were collected together with 1,2-dichloroethane at the outlet of the bottom thereof and stored in the product tank.

The various parameters involved in the operation above described are as follows:

| | | |
|---|---|---|
| I | Reaction conditions | |
| | reaction temperature | 100°C |
| | pressure in the pipe reactor | 1.4 kg/cm²G |
| | supplying speed of 1,2-dichloroethane | 298 ml/hr. |
| | supplying amount of 1,2-dichloroethane | 3360 ml. |
| | supplying speed of gaseous formaldehyde | 29 g/hr. (as the purified formaldehyde) |
| | supplying amount of gaseous formaldehyde | 318 g (as the purified formaldehyde) |
| II | Reaction results. | |
| | trioxane obtained in the tank | 221 g |
| | formaldehyde contained in the tank | 93 g |
| | The yield of trioxane | 69.5% |

In this example, gaseous formaldehyde was prepared by heating and depolymerizing paraformaldehyde containing 95.1 weight percent of formaldehyde.

EXAMPLE 16

100 g of p-formaldehyde containing formaldehyde at 80.5 weight percent and also 350 g of 1,2-dichloroethane were charged and distilled in a distillation kettle of 60 ml having a fractional distillation column filled with metallic packing 500 mm high in a column of 30 mm in inner diameter. Fractional distillation was stopped after 81 g of distillate was obtained at a temperature of 72° C to 73° C. This distillate showed a composition of 78.9 weight percent of 1,2-dichloroethane, 19.1 weight percent of water and also 2 weight percent of formaldehyde in a gas chromatography type analysis, and apparently two phases of water and 1,2-dichloroethane were formed therein whereupon the water phase eventually virtually dissolves in the formaldehyde. The remainder as a result of said distillation contained 365 g of a homogeneous transparent solution containing 77.5 weight percent of 1,2-dichloroethane, 21.4 weight per cent of formaldehyde and 1.1 weight percent of water. After said remainder was moderately cooled, the fractional distillation column was disconnected from the kettle, and then 15 g (0.026 N) of the same catalyst used in Example 1 was introduced into said remainder liquid in the kettle. The reaction was continued at a temperature of 100° C for 40 min., while the well-closed kettle was shaken in an oil bath. In a gas chromatography analysis, the yielded solution showed a composition of 15.2 weight percent of trioxane, 6.2 weight percent of formaldehyde, 77.7 weight percent of 1,2-dichloroethane and also 0.9 weight percent of water.

The net product of trioxane was 55.5 g and no by-products were observed. Finally, the trioxane product was successively separated by distilling said yielded solution at a temperature of about 114.8° C. Trioxane in high purity containing substantially no water and no formaldehyde was produced. This yield of trioxane was 68.9 percent based on the charged formaldehyde, and also 71.1 percent based on the formaldehyde in the remainder solution.

EXAMPLE 17

100 g of an aqueous formaldehyde solution containing formaldehyde in amount of 30.2 percent by weight and also 370 g of 1,2-dichlorethane were charged into the same apparatus as that of Example 16. When the distillate amounted to 347 g therefrom at a temperature of 72° C to 73° C, fractional distillation was stopped and the remainder liquid in the apparatus was cooled. Said distillate separated into two phases containing 72 g of water and 275 g of 1,2-dichloroethane; the water phase containing 5.0 weight percent of formaldehyde. After the remainder solution was cooled and the fractional distillation column disconnected, the same catalyst of Example 14 was introduced into said remainder solution in an amount of 10 g (0.066 N). The reaction was effected at a temperature of about 80° C for 45 min., while the well-closed apparatus was shaken in an oil bath. In a gas chromatography analysis, the yielded liquid after the reaction contained apparently 19.1 g of trioxane. This yield of trioxane is 63.4 percent based on the charged formaldehyde, and also 71.8 percent based on the formaldehyde in the remainder liquid. In the liquid product, formaldehyde and water were found but substantially no other by-products were observed therein.

EXAMPLE 18

100 g of an aqueous formaldehyde solution containing formaldehyde in an amount of 37.4 weight per cent, methanol in an amount of 7.2 percent by weight and 445 of 1,2-dichloroethane were charged into the same apparatus as that of Example 16, and distilled in the same manner. The distillate began to flow out of the top of the apparatus at a temperature of 61° C, and between 72° C to 73° C the distillate assumed a constant flow. When the distillate reached 293 g, the fractional distillation was stopped. The composition of the distillate was 1,2-dichloroethane 9.0 weight per cent, water 17.9 weight per cent, formaldehyde 0.6 weight per cent and methanol in an amount of 2.5 weight per cent. On the other hand, 247 g of a homogeneous transparent solution remained in the apparatus. Its composition was 1,2-dichloroethane in an amount of 84.7 weight per cent, formaldehyde 14.1 weight per cent and water in an amount of 1.2 weight per cent as determined by gas chromatography analysis. The column was disconnected from the apparatus and the same catalyst as that of Example 16 was introduced into the homogeneous solution in an amount of 5 g (0.012 N). The reaction was then continued at 130° C for about 40 min., while shaking the well-closed apparatus in an oil bath.

The yielded liquid was cooled after the reaction was completed. The composition of the later liquid was as follows: trioxane 9.6 weight per cent, formaldehyde 4.1 weight per cent, water 0.9 weight per cent, 1,2-dichloroethane 85.0 weight percent and methyl formate in an amount of 0.4 weight percent as determined by a gas chromatography analysis. The yield of trioxane was 23.8 g which was 63.7 percent based on the charged formaldehyde, or 68.6 percent based on the formaldehyde in the remainder liquid.

EXAMPLE 19

30 g of p-formaldehyde with 80.5 weight percent of formaldehyde content and also 450 g of dichloromethane were charged into the same apparatus used in Example 16 and the fractional azeotropic distillation was carried out according to this example. When the distillate amounted to about 31.3 g at a distilling temperature of 38° C, the fractional distillation was stopped. The composition of said distillate was 98.4 weight percent of dichloromethane, 1.5 weight per cent of water and 0.1 weight percent of formaldehyde determined by a gas chromatography analysis. On the other hand, the composition of the homogeneous transparent remainder solution amounted ti85.0 weight percent of dichloromethane, 14.4 weight percent of formaldehyde and 0.7 weight percent of water. The catalyst prepared by impregnating 98 weight parts of phosphoric acid into 1,000 weigh parts of activated alumina was dried under 110° C, and 10 g (0.028 N) of the powder-like catalyst was introduced into said remainder solution.

The reaction then was carried out at 90° C for 50 min., in the same manner as in the above examples. The yielded liquid in the well-closed apparatus was as follows: 10.3 weight percent trioxane, formaldehyde 4.1 weight percent, dichloromethane 85.3 weight percent and water in an amount of 0.3 weight percent as determined by a gas chromatography analysis. The yield of trioxane produced was 16.8 g which is 69.4 percent based on the charged formaldehyde, or 71.7 percent based on the formaldehyde in the remainder solution after distillation.

EXAMPLE 20

Charging into the same apparatus of Example 16, 30 g of p-formaldehyde with 80.4 weight percent of a formaldehyde content and also 510 g of 1,2-dichloropropane were charged into the same apparatus as Example 16 and the azeotropic distillation carried out and the distillation stopped after the distillate amounted at 45 g under a distillating temperature of 78° to 79° C. The composition of said distillate was 86.9 weight percent of 1,2-dichloropropane 11,8 weight percent of water and 1.3 weight percent of formaldehyde due to the gas chromatography analysis. The composition of the homogeneous transparent liquid remaining after the distillation was 95.1 weight per cent of 1,2-dichloropropane, 4.8 weight percent of formaldehyde and 0.1 weight percent of water in the amount of 490 g thereof. Then, 5 g (0.0062 N) of the same catalyst used in Example 6 was introduced into said remainder solution, and the reaction was then carried out at 150° C for 80 min. while shaking the reaction liquid in an oil bath.

As determined by gas chromatography analysis, the composition of the yielded liquid was 3.3 weight percent of trioxane, 0.7 weight percent of formaldehyde, 0.7 weight percent of methyl formate, 95.0 weight percent of 1,2-dichloropropane and 0.3 weight percent of water. The yield of trioxane was 67.5 percent based on the charged formaldehyde, or 69.9 percent based on the formaldehyde in the remainder.

EXAMPLE 21

Into the same apparatus as used in Example 16, 30 g of p-formaldehyde with a formaldehyde content of 80.4 weight percent and also 375 g of cis-1,2-dichloroethylene were charged therein and azeotropic distillation was carried out. Then, said distillation was stopped when the distillate amounted to 143 g at a distillating temperature of 56° C. As a result of this distillation, the composition of the distillate amounted to 96.5 weight percent of cis-1,2-dichloroethylene, 3.4 weight percent of water and 0.1 weight percent of formaldehyde as determined by a gas chromatography analysis. On the other hand, the composition of the homogeneous remainder liquid amounted to 90.5 weight percent of cis-1,2-dichloroethylene, 9.2 weight percent of formaldehyde and 0.3 weight percent of water. The amount of remainder liquid totaled 258 g. The catalyst was prepared by impregnating aluminum sulfate into silica gel in the ratio of one weight part of aluminum sulfate to 10 weight parts of silica gel.

2.5 g (0.0068 N) of this catalyst in the state of a powder dried at 110° C was introduced into said remainder liquid, and the reaction was effected at 100° C for 160 min., while shaking the well-closed apparatus in an oil bath. As determined by a gas chromatography analysis, the composition of the yielded liquid was as follows: 6.4 weight percent of trioxane, 2.8 weight percent of formaldehyde, 0.2 weight percent of water and 90.6 weight percent of cis-1,2-dichloroethylene. The final trioxane product was produced in an amount of 16.4 g which is 67.9 percent based on the charged formaldehyde, 69.6 percent based on the formaldehyde in the remainder liquid after distillation.

EXAMPLE 22

Into a distilling apparatus which was the same as in the Example 16 were charged 30 g of p-formaldehyde containing 80.4 weight percent of formaldehyde and 480 g of trans-1,2-dichloroethylene and distilled. The distillation was stopped when 253 g of the distillate was obtained at a distilling temperature 46° C. It was found from a gas chromatography analysis that this distillate was composed of 98.0 weigh percent of trans-1,2-dichloroethylene, 1.9 weight percent of water and 0.1 weight percent of formaldehyde. Also, the remainder liquid in said apparatus was found to be 253 g and a gas chromatography analysis indicated that the components of this liquid were 90.3 weight per cent of trans-1,2-dichloroethylene, 9.3 weight percent of formaldehyde and 0.4 weight percent of water. After the fractional distillation column was removed, 20 g (0.0218 N) of activated alumina powder which was previously dried at 130° C was added to said remainder liquid and then reacted at 80° C for 120 minutes with an effective shaking in an oil bath. After the reaction was over, the liquid was cooled and the products thus obtained were analyzed by gas chromatography. It was found that the components of the products were 6.2 weight percent of trioxane, 3.1 weight percent of formaldehyde, 90.5 weight percent of trans-1,2-dichloroethylene and 0.2 weight percent of water. Actual amounts of trioxane in these products was 15.8 g and the yields thereof were 65.1 percent and 66.7 percent based on the raw formaldehyde and the formaldehyde in said remainder, respectively.

EXAMPLE 23

A distilling apparatus was used in this example, which apparatus was provided with a fractional distillation column made of stainless steel of an inner diameter of 39.4 mm and a height of 3,000 mm which was packed at a height of 2,800 mm with a McMahon packing of stainless steel of a diameter 6 mm and a reboiler thereunder. The mixed liquid of a preheated formaldehyde aqueous solution at 70° C and a lower aliphatic hydrocarbon dihalide were successively introduced from a side pipe located 300 mm from the bottom of said packing. The liquid was distilled at a reflux ratio 2.0 and then the mixture of the dilute formaldehyde aqueous solution and the lower aliphatic hydrocarbon dihalide were distilled out from the top of the column. The remainder liquid at the bottom of the apparatus was led to a continuous reactor packed with a solid acid catalyst by a piston pump, said liquid being passed through a buffer tank to operate the reaction. After storing the reaction liquid in a tank, it was weighed and analyzed. In this procedure, the formaldehyde aqueous solution and the lower aliphatic hydrocarbon dihalide were transferred to a distilling apparatus operated each by independent pumps and the two liquids were mixed in a transferring pipe connected to said apparatus. Also, prior to the actual distilling, the lower aliphatic hydrocarbon dihalide was previously charged in the reboiler of the distilling apparatus wherein said apparatus was preheated by distilling with total reflux. Thereafter, when a predetermined temperature was reached, the raw distilling substance was introduced to initiate the distillation.

The reactor actually used in this process was a continuous one made of a stainless steel pipe having inner diameter of 30 mm and a height of 600 mm, said pipe being packed at a height of 500 mm with a solid acid catalyst having a diameter 3 mm and a height 3 mm. The remainder liquid after distillation was introduced into the bottom of the reactor and taken off from the top of the reactor.

The various conditions utilized and results of operating a reaction according to the above process is shown in Table 1 appended hereto.

TABLE I

| Test number | I | II | III |
|---|---|---|---|
| Operating condition— | | | |
| Distilling condition: | | | |
| Raw material for distillation: | | | |
| Concentration of aqueous formaldehyde solution (wt. percent) | 79.2 | 41.0 | 79.2 |
| Amount of formaldehyde aqueous solution supplied: | | | |
| Gram per hour (g.) | 350 | 153 | 283 |
| Total amount supplied (g.) | 4,200 | 1,224 | 1,981 |
| Kind of the lower aliphatic hydrocarbon dihalide | 1,2-dichlorethane | 1,2-dichloroethane | 1,2-dichloropropane |
| Amount of the lower aliphatic hydrocarbon supplied: | | | |
| Gram per hour (g.) | 1,236 | 1,521 | 1,619 |
| Total amount supplied (g.) | 14,832 | 12,168 | 11,333 |
| Distillation pressure | Atmospheric pressure | Atmospheric pressure | Atmospheric pressure |
| Temperature of the top of the column (° C.) | 72 | 72 | 78 |
| Temperature of the bottom of the column (° C.) | 85 | 85 | 101 |
| Distillate: | | | |
| The amount of distillate per hour (g.) | 381.4 | 468.9 | 498.9 |
| Total amount of distillate (g.) | 4,576.8 | 3,751.2 | 3,492.3 |
| Bottom solution: | | | |
| The amount of bottom solution per hour (g.) | 1,204.6 | 1,205.1 | 1,403.1 |
| Total amount of bottom solution (g.) | 14,455.2 | 9,640.8 | 9,821.7 |
| Reaction condition: | | | |
| Kind of solid acid catalyst | Silica alumina containing 13 wt. percent of alumina | 1 g. of silica alumina I impregnated with 1 mg.-mol of phosphoric acid | 1 g. of silica gel impregnated with 1 mg.-mol of aluminum sulfate |
| Reaction condition (bottom solution): | | | |
| Amount supplied per hour (g.) | 1,204.6 | 1,205.1 | 1,403.1 |
| Total amount supplied (g.) | 14,455.2 | 9,640.8 | 9,821.7 |
| Reaction temperature (° C.) | 110 | 85 | 128 |
| Result— | | | |
| Trioxan obtained: | | | |
| Amount per hour (g.) | 193.8 | 43.3 | 153.4 |
| Total amount (g.) | 2,325.6 | 346.4 | 1,073.8 |
| Yield based on raw formaldehyde (percent) | 69.9 | 69.1 | 68.5 |

EXAMPLE 24

A. An aqueous suspension containing 41 weight percent of p-formaldehyde and a lower aliphatic hydrocarbon dihalide were distilled at an ordinary pressure in a 2 liter distillation kettle equipped with a distilling column having an inner diameter of 30 mm which was packed at a height 800 mm with metal packings. When pre-determined amounts of the distillate were obtained at a pre-determined distillation temperature, the distilling operation was stopped. Thereafter, 100 g of the transparent remainder liquid obtained by said distillation were charged in a metal reactor having a capacity of 140 ml. equipped with a lid and into the remainder liquid were added 2.0 g of dried silica alumina powder containing 13 weight percent of alumina, and these components were then sealed therein. Then, the reaction was operated at a pre-set temperature with effective shaking by use of an oil bath. The time at which a pre-set or pre-determined yield of trioxane was obtained, was measured by way of measuring the products at particular set times during the reaction.

B. For the purpose of comparison, the liquid comprising the same components as the remainder solution obtained in (A) was prepared by mixing 96 weight percent paraformaldehyde, a lower aliphatic hydrocarbon dihalide and water. This mixture was a white muddy liquid and was treated according to the reaction conditions set forth in (A) above and the reaction timed in order to obtain a predetermined yield of the desired product.

The results are shown in Table II.

TABLE II

|  | Test No. | | | | | |
|---|---|---|---|---|---|---|
|  | I | | II | | III | |
| Case [1] | (A) | (B) | (A) | (B) | (A) | (B) |
| Raw material for distillation: | | | | | | |
| Amount of 41 wt. percent suspension of paraformaldehyde (g.) | 200 | | 100 | | 202 | |
| Kind of the lower aliphatic hydrocarbon dihalide [2] | ([5]) | ([5]) | ([6]) | ([6]) | ([7]) | ([7]) |
| Amount of the lower aliphatic hydrocarbon dihalide (g.) | 1,315 | | [3]4,760 | | 1,170 | |
| Distillation temperature (° C.) | 72-73 | | 38 | | 78 | |
| Amount of distillate | 696 | | 3,865 | | 991 | |
| Bottom solution: | | | | | | |
| Amount [4] (g.) | 915 | 915 | 990 | 990 | 376 | 376 |
| Formaldehyde (wt. percent) | 8.3 | 8.3 | 3.8 | 3.8 | 18.6 | 18.6 |
| Hydrocarbon dihalide (wt. percent) | 91.4 | 91.4 | 96.1 | 96.1 | 80.9 | 80.9 |
| Water (wt. percent) | 0.3 | 0.3 | 0.1 | 0.1 | 0.5 | 0.5 |
| Reaction temperature (° C.) | 100 | 100 | 110 | 110 | 90 | 90 |
| Pre-set yield (percent) | 60 | 60 | 50 | 50 | 60 | 60 |
| Time required (min.) | 18 | 103 | 13 | 65 | 21 | 134 |

[1] (A) is such a case as operated continuously by distillation and reaction; (B) is such a case as operated by only reaction.
[2] (B) is an organic solvent used in the reaction.
[3] Added dividedly, that is, added by 1,500 g. prior to distillation, and the remainder was added at option during a distillation.
[4] B shows amount of raw material solution reacted.
[5] 1,2-dichloroethane.
[6] Dichloromethane.
[7] 1,2-dichloropropane.

EXAMPLE 25

A distillation apparatus having a 500 ml distilling kettle was equipped with a distilling column still containing the following three beds: a 500 ml packed bed (packed with stainless steel ring packing); a solid acid catalyst bed thereon (in which silica alumina containing 13 weight percent of alumina was formed into a shape of a cylinder) and another packed bed on top of said acid catalyst (packed with stainless steel ring packing) was used herein. Into this apparatus were charged 100 weight parts of a formaldehyde aqueous solution containing 31 weigh percent of formaldehyde and 350 weight parts of 1,2-dichloroethane which components were distilled at a gauge pressure of 1 kg/cm$^2$G. When 346 weight parts of distillate were distilled out, the distillation was further continued under total reflux conditions. After 3 hours from the initiation of the evaporation of the distillate from the top of the column, the liquid in the kettle was cooled.

The liquid temperature in the kettle during the total reflux distillation was 108° C. After cooling, the liquid in the kettle was analyzed by means of gas chromatography. It was found that 26.1 weight parts of trioxane were obtained and the yield based on the raw formaldehyde was 84.3 percent. Very little formaldehyde and by-products were observed.

EXAMPLE 26

Into the kettle of a batch distillation apparatus equipped with a distilling column consisting of a catalyst bed, a packed bed (packed from the upper portion of said catalyst bed to the top of the column) and another packed bed packed under the bottom of said catalyst bed were charged 100 weigh parts of paraformaldehyde containing 95.1 weight percent of formaldehyde and 100 weight parts of 1,2-dichloroethane and these were distilled at a gauge pressure of 1 kg/cm$^2$G under conditions of total reflux. A catalyst which was the same as in Example 25 was also used in this example. When no formaldehyde in the kettle was observed, the distillation was stopped, which occurred 3 hours from the beginning of said distillation. Then, the liquid in the kettle was cooled and analyzed by gas chromatography. 89.4 weight parts of trioxane were found to be produced and the yield thereof based on the charged formaldehyde was 94.0 percent. After that, the liquid in the kettle was transferred into the other distillation still and distilled. An analysis of the distillate at 114.6° C indicated these to be less than 0.01 weight percent of formaldehyde and the same amount of water and less than 0.001 weight percent of formic acid.

EXAMPLE 27

Into a distillation apparatus, the same as that used in Example 26, were charged 100 weight parts of p-formaldehyde with a 90.4 weight percent of formaldehyde content and also 200 weight parts of 1,2-dichloropropane and the distillation was carried out in a manner of total reflux. A cylindrical catalyst containing 62 weight parts of boric acid impregnated into 1,000 weight parts of silica alumina was made use of therein. After 3 hours and about 20 minutes the distillation was terminated, when the liquid in said apparatus did not contain formaldehyde therein. The trioxane was found to be 82.3 weight parts which amounts to 91 percent based on the charged formaldehyde. This was determined by gas chromatography analysis. Finally, the product of trioxane was separated from said yielded remainder solution by way of fractional distillation under a distillation temperature of 114.6° C in another distilating apparatus. The purity of said trioxane was high containing less 0.01 weight percent of formaldehyde, less 0.01 weight percent of water and less 0.001 weight percent of formic acid.

EXAMPLE 28

50 weight parts of p-formaldehyde with 90.4 weight percent of a formaldehyde content and also 300 weight parts of cis-1,1-dibromoethylene were charged into the same apparatus in Example 26, and atmospheric distillation was carried out under conditions of total reflux. A cylindrical catalyst containing phosphoric acid impregnated into silica alumina in the ratio of 98 weight parts of phosphoric acid to 1,000 weight parts of silica alumina and then dried was used therein.

For 150 minutes the atmospheric distillation was carried out and stopped, when the formaldehyde was no longer observed therein. The yield of trioxane was 42 weight parts, which amounts to 93.0 percent based on the charged formaldehyde.

EXAMPLE 29

A total reflux atmospheric distillation was carried out by use of the same apparatus in Example 26, into which apparatus 100 weight parts of α-polyoxymethylene with 99.6 weight percent of formaldehyde therein and also 70 weight parts of 1,2-dichloropropane were charged and distilled at a temperature of 104° C. The dried catalyst used here contains aluminum sulfate which is impregnated into a granulated silica gel in the ratio of 342 weight parts of aluminum sulfate to 1,000 weight parts of the granulated silica gel. The distillation was over after 3 hours, when no formaldehyde was observed therein. The yield of trioxane was 93.6 weight parts, which amounts to 94 percent based on the charged formaldehyde.

EXAMPLE 30

This experiment was carried out in the same type of apparatus as shown in FIG. 1, which comprises a catalytic layer, an upper packed layer connected to an upper portion of the catalytic layer and a top thereof, a lower packed layer connected to a lower portion of the catalytic layer and a downward portion thereof.

In a ratio of 1,255 weight parts of 1,2-dichloroethane to 145 weight parts of α-polyoxyethylene containing formaldehyde in an amount of 99.6 percent by weight, this mixture was introduced into the upper portion of the catalytic layer at a rate of 876 weight parts per hour, and atmospheric distillation was carried out in the same manner of total reflux and in the presence of the same catalyst as recited in Example 25, being packed into a catalytic layer. The remainder liquid flowed continuously at a rate of 875 weight parts per hour, which contained the product of trioxane in the amount of 9.6 percent by weight. The yield was 93 percent based on the supplied formaldehyde.

EXAMPLE 31

The raw material mixture of a formaldehyde aqueous solution containing 40.1 weight percent of formaldehyde and 1,2-dichloroethane in the proportions of 447.4 weight parts of the former to 1109.8 weight parts of the latter was continuously introduced every hour into such portion of the same apparatus shown in FIG. 1 packed with the same catalyst used in Example 25. The distillation was carried out and the azeotropic mixture of water and 1,2-dichloroethane was drawn off from the top of said apparatus. The yield of trioxane flowing out the bottom of said apparatus was obtained at a rate of 165.1 weight parts per hour. On the other hand, from the decanter, the aqueous formaldehyde solution containing 6 weight percent of formaldehyde and 1,2-dichloroethane was recovered at a rate of 1285.1 weight parts per hour.

As a result of an analysis by gas chromatography, the purity of trioxane was found to be 98.2 percent by weight, and 1,2-dichloroethane was the only recognized impurity. The yield of trioxane was 90.4 percent based on the supplied formaldehyde, or 99.9 percent based on the formaldehyde in the reaction liquid.

EXAMPLE 32

Into the same apparatus as in Example 31, were charged 992.7 weight parts of an aqueous formaldehyde solution containing formaldehyde in an amount of 78.2 weight percent and also 1606 weight parts of 1,2-dichloropropane were continuously introduced in the above ratio every hour, and the liquid distilled at atmospheric pressure at temperature of 78° C at the top of said apparatus and also 99° C at the catalytic layer. The azeotropic mixture of water and 1,2-dichloropropane was drawn off of the top thereof. The catalyst packed into the catalytic layer was the same as that used in Example 28. As a result the trioxane product was collected at the rate of 764.1 weight parts per hour, and also the dilute aqueous formaldehyde solution containing 12.0 weight percent formaldehyde was continuously recovered at the rate of 245.9 weight parts per hour from the decanter. The purity of the trioxane was 97.6 percent by weight, and the only impurity was 1,2-dichloropropane. This is a 96.1 percent of yield based on the supplied formaldehyde, or 99.9 percent based on the formaldehyde in the reaction liquid.

EXAMPLE 33

Into the same apparatus used in Example 31, a similar composition containing 340 weight parts of aqueous formaldehyde solution containing a formaldehyde content of 78.2 weight percent and also 2134.5 weight parts of cis-1,2-dichloroethylene were continuously introduced into the apparatus at the above ratio every hour, and atmospheric distillation was carried out under temperature of 55.5° C at the top of said apparatus and also 99° C at the catalytic layer therein. The azeotropic mixture of water and cis-1,2-dichloroethylene was drawn off from the top thereof. The catalyst packed in the catalytic layer was the same as used in Example 29. As a result, the trioxane product was collected at a continuous flow of 265.7 weight parts per hour. Also the dilute aqueous formaldehyde solution containing 3.2 percent by weight formaldehyde was continuously recovered at a rate of 76.2 weight parts per hour from the decanter. The purity of the trioxane was 98.6 weight percent and the only impurity was cis-1,2-dichloroethylene. Additionally, the yield of trioxane was 99 percent based on the supplied formaldehyde, or 99.9 percent based on the formaldehyde in the reaction liquid.

EXAMPLE 34

Waste aqueous formaldehyde solution from an industrial plant producing p-formaldehyde was used as the raw material in this example which raw material accidentally contained 12.6 percent by weight formaldehyde and 2.1 percent by weight methanol. Into the same apparatus as used in Example 31, 306.6 weight parts of said waste aqueous formaldehyde solution and also 1107.5 weight parts of 1,2-dichloroethane were continuously introduced as a mixture in such ratio every hour, and atmospheric distillation was carried out under a temperature of 70.3° C at the top of the apparatus and 84° C at the catalytic layer. The azeotropic mixture of water and 1,2-dichloroethane was drawn out in the previously mentioned manner. The catalyst used contained silica alumina containing alumina at 25 percent by weight in the shape of a cylinder. The yield of trioxane was collected continuously flowing at a rate of 25.2 weight parts per hour. The dilute aqueous formaldehyde solution containing 5.0 weight percent formaldehyde and also 2.02 weight per cent methanol was continuously recovered with the 1,2-dichloroethane from the decanter. The purity of the trioxane was 97.1 weight per cent and the only impurity was 1,2-dichloroethane. This figures out to be 63.4 percent of the yielded trioxane based on the supplied formaldehyde of the waste liquid or 99.9 percent based on the formaldehyde in the reaction liquid. v

What is claimed is:

1. A method of producing trioxan which comprises heating a liquid mixture of formaldehyde and a lower aliphatic hydrocarbon dihalide of one to four carbon atoms in the presence of a non-volatile solid acid catalyst containing aluminum at a reaction temperature of between 80° C and 130° C.

2. A method according to claim 1 wherein the lower aliphatic hydrocarbon dihalide is a saturated lower aliphatic hydrocarbon of one to two carbon atoms.

3. A method according to claim 1 wherein the lower aliphatic hydrocarbon dihalide is selected from the group consisting of dichloromethane, dibromomethane, diiodomethane, bromoiodomethane, 1,1-dichloroethane, 1,1-diiodoethane, 1,1-dibromoethane, 1,2-dichloroethane, 1,2-dibromoethane, 1,1-dichloropropane, 2,2-dibromopropane, 1,2-dichloropropane, 1,2-diiodopropane, 1,3-dichloropropane, 1,3-dibromopropane, 1-chloro-2-bromoethane, 1,2-dibromoethylene, 1,2-dichloroethylene, 1,2-diiodoethylene, and mixtures thereof.

4. A method according to claim 1 wherein the formaldehyde is present in amounts of 0.02–0.3 weight percent based on the weight of the lower aliphatic hydrocarbon dihalide.

5. A method according to claim 1 wherein the formaldehyde contains water in an amount of no more than 20 weight percent.

6. A method as in claim 1 which comprises:
   1. removing water which is contained in the raw formaldehyde in an amount of no more than 20 weight percent by heating the water and the lower aliphatic hydrocarbon dihalide to form an azeotropic mixture therefrom, and
   2. heating the remaining formaldehyde-lower aliphatic hydrocarbon dihalide in the presence of the solid acid catalyst to form the desired trioxan product.

7. A method according to claim 1 which comprises:
   1. removing water contained in the raw material formaldehyde by way of an azeotropic distillation with the lower aliphatic hydrocarbon dihalide, wherein the azeotropic temperature of this mixture has a temperature lower than that of the azeotropic temperature of a water-trioxane mixture, said distillation being carried out in a distilling apparatus packed with a layer of solid acid catalyst, and
   2. heating the liquid phase formaldehyde-lower aliphatic hydrocarbon dihalide mixture in the presence of the solid acid catalyst.

8. A method as in claim 1. wherein:
   1. a mixture of substantially anhydrous formaldehyde is used and subjected to total reflux with the lower aliphatic hydrocarbon dihalide solvent, said reflux being carried out in a distilling apparatus packed with a layer of solid acid catalyst, and
   2. heating the liquid formaldehyde and lower aliphatic hydrocarbon dihalide mixture in the presence of a solid acid catalyst.

* * * * *